No. 668,946. Patented Feb. 26, 1901.
J. H. BAKER, G. F. SHEVLIN & F. H. BAKER.
VALVE FOR WOOD PULP DIGESTERS OR SIMILAR DEVICES.
(Application filed Feb. 15, 1900.)
(No Model.) 2 Sheets—Sheet 1.
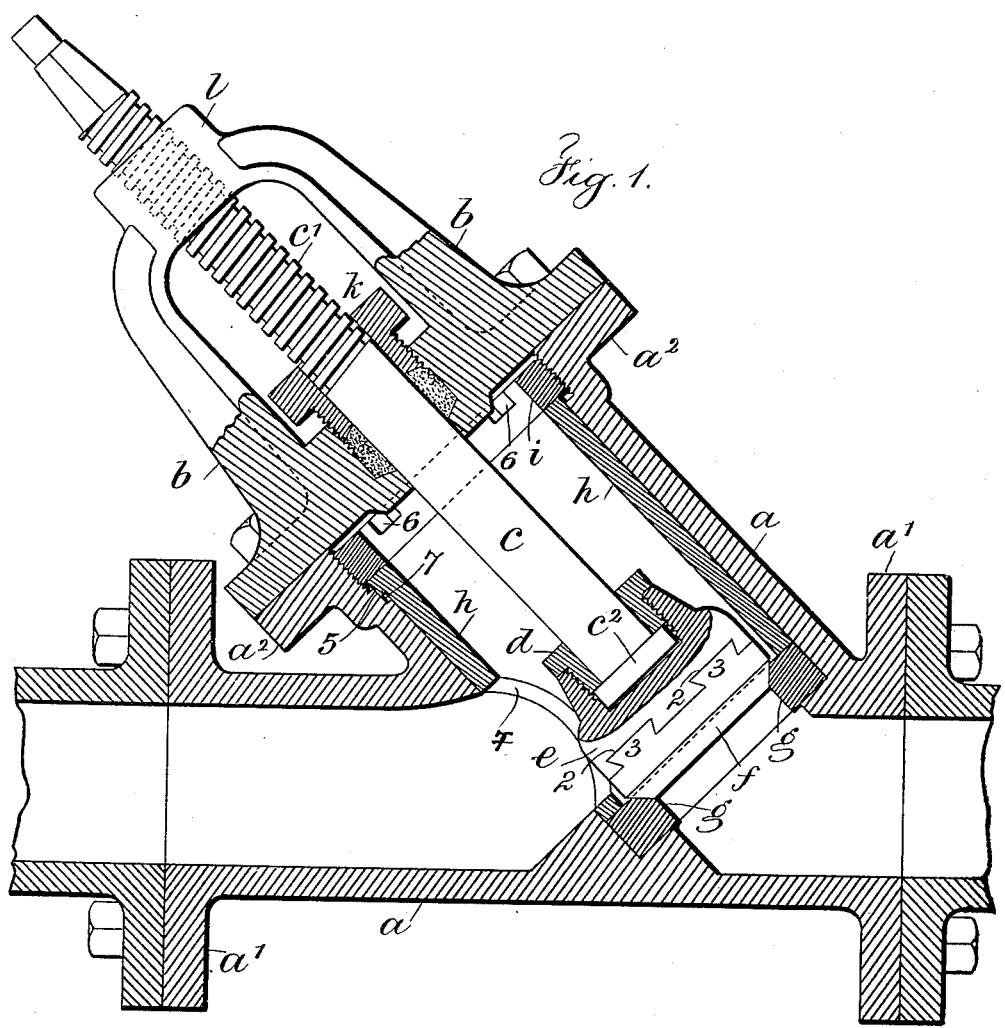
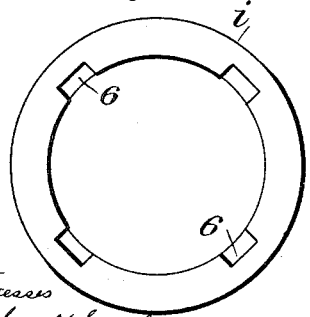
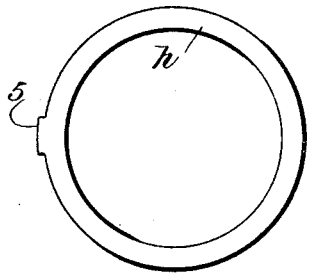
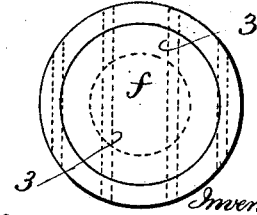
Witnesses
Chas H Smith
J. Staib
Inventors
James H. Baker
George F. Shevlin
Frederick H. Baker No. 668,946. Patented Feb. 26, 1901.
J. H. BAKER, G. F. SHEVLIN & F. H. BAKER.
VALVE FOR WOOD PULP DIGESTERS OR SIMILAR DEVICES.
(Application filed Feb. 15, 1900.)
(No Model.) 2 Sheets—Sheet 2.
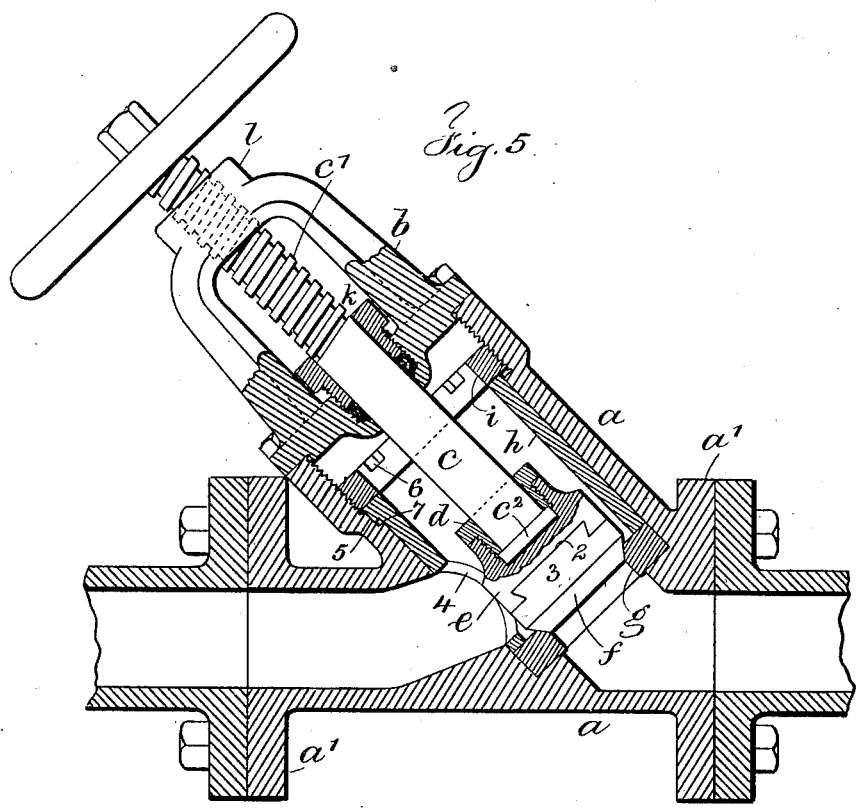

UNITED STATES PATENT OFFICE.

JAMES H. BAKER, GEORGE F. SHEVLIN, AND FREDERICK H. BAKER, OF SARATOGA SPRINGS, NEW YORK.

VALVE FOR WOOD-PULP DIGESTERS OR SIMILAR DEVICES.

SPECIFICATION forming part of Letters Patent No. 668,946, dated February 26, 1901.

Application filed February 15, 1900. Serial No. 5,245. (No model.)

*To all whom it may concern:*

Be it known that we, JAMES H. BAKER, GEORGE F. SHEVLIN, and FREDERICK H. BAKER, citizens of the United States, residing at Saratoga Springs, in the county of Saratoga and State of New York, have invented an Improvement in Valves for Wood-Pulp Digesters or Similar Devices, of which the following is a specification.

Our invention relates to an improvement in valves having renewable parts, and which valves are especially adapted for use in mills preparing wood-pulp for paper-making and in mills where acid is used in the operations of the digester to obviate the difficulties and expense heretofore experienced in the removal or renewal of such valves or their parts, as heretofore with these valves it has been necessary to take the valve-body out of its position in the line of piping in order to renew the valve, and our invention is designed to obviate these difficulties.

We employ a valve having a body in the line of piping, and which body preferably includes a cylindrical portion receiving the valve and valve-stem and to which a removable bonnet is secured. We make use of a removable valve-seat and a removable valve-face, preferably of acid-proof metal, and also a removable sleeve within the body of the valve and a removable nut screwing into the open end of the body against the said sleeve, with the sleeve in turn bearing upon and forcibly holding to place the valve-seat of the valve.

The details of the device and the mode of operation are hereinafter more particularly described.

In the drawings, Figure 1 is a vertical section and partial elevation representing our improvement. Fig. 2 is an end view of the sleeve. Fig. 3 is an end view of the clamping-nut. Fig. 4 is an inverted plan of the valve-face, and Fig. 5 is a vertical section and partial elevation representing a slightly-modified form of valve.

The valve-body $a$ is provided with flanges $a'$ to connect the same in the line of piping from the digester or other structure, and this valve-body includes the cylindrical inclined portion having a flange $a^2$. The bonnet $b$ of the valve rests upon and is securely bolted to the flange $a^2$, and the said bonnet is made with an integral interiorly-threaded hub $l$ for the threaded portion $c'$ of the valve-stem $c$, and the said valve-stem $c$ is made with a head $c^2$ at the lower end, and a nut $d$ fits around the valve-stem $c$ adjacent to the head $c^2$, and the valve-disk $e$ receives the head $c^2$ and the nut $d$, the nut $d$ screwing into the open end of the valve-disk, so as to hold the head of the valve-stem freely within the same, so that the said head and stem can turn without turning the valve-disk as the same is screwed to place in closing the valve.

The valve-face $f$ is preferably of acid-proof metal, and both the valve-face and the body of the valve may, if desired, be made of bronze metal. The outer face of the valve-disk $e$ is made with dovetailed recesses 2 and the adjoining surface of the valve-face $f$ is made with dovetailed ribs 3, these parts fitting tightly together, so that by the said dovetailed ribs and recesses the valve-face $f$ is held to the valve-disk $e$. The periphery of the said valve-face is tapering, as is also the adjacent corner of the removable valve-seat $g$, against which the tapering surface of the valve-face fits when the valve is closed.

The valve-seat $g$ rests against a shoulder in the valve-body at the base of the inclined portion of the valve-body, and we provide a removable sleeve $h$, adapted to be passed into the inclined portion of the valve-body with its lower edge against the valve-seat $g$, and the said removable sleeve is provided with an opening 4, agreeing with the opening in the valve-body and providing a passage from one end of the valve-body through the valve-seat $g$ into the removable sleeve $h$ through its opening 4 into the other portion of the valve-body, and this removable sleeve $h$ is provided with a lug 5 adjacent to its upper edge, which lug enters a recess 7 in the valve-body $a$, and the upper end of the valve-body adjacent to the flange $a^2$ is interiorly threaded to receive the nut $i$, which screws therein and comes down upon the removable sleeve $h$, and this nut $i$ is provided with holes 6 for a spanner, which screws the same to place and forces the removable sleeve $h$ against the valve-seat $g$ to hold the same in position. The lug 5 of the sleeve $h$ in the recess 7 of the body $a$ prevents the action of the nut $i$ turning the sleeve $h$ as the said nut is screwed to place.

The bonnet $b$ is made with a stuffing-box and gland $k$, through which the valve-stem $c$ passes, the said stuffing-box forming a closure around the valve to prevent the escape of the liquid passing through the valve and connecting-pipes. In the operation of the parts the rotation of the valve-stem $c$ in one direction forces the face of the valve against the seat $g$ to close the same, and in the other direction the valve is lifted from the seat to any desired extent, so as to permit the free passage of the liquid or pulp material from the digester in the paper-mill. When the valve becomes more or less worn, leaky, or useless and it is desirable to replace any one or more of the parts, the bonnet $b$ is readily removed by unscrewing the bolts or nuts securing the same to the flange $a^2$, and with the removal of the bonnet the valve-stem $c$, the nut $d$, the valve-disk $e$, and the face $f$ all come away from the valve-body. The nut $d$ may be unscrewed from the disk $e$ and the face $f$ removed from the disk $e$, so that any of these parts thus exposed may be readily renewed.

With the parts just named removed from the valve-body a spanner may be employed to engage the nut $i$, unscrew the same, and back it out of the valve-body. The removable sleeve $h$ is then readily lifted out of the valve-body and access obtained to the valve-seat $g$ for its removal. New parts can then be inserted in place of the said parts removed and the valve and bonnet replaced ready for use without in any sense disturbing the valve-body $a$ in the line of piping.

In the modification, Fig. 5, we have shown slight changes to the form of valve. In this form the valve-body between the flanges $a'$ is shortened considerably and the inclined portion slightly lengthened, the flanges $a^2$ being dispensed with. The bonnet is made narrower and with a depressed center for the stuffing-box gland $k$ and shouldered to set upon and slightly within the edge of the inclined part of the body $a$. The threaded portion $c'$ of the stem is thus kept out of the gland $k$, and the acid-proof valve-face $f$ is made with one dovetailed rib 3, connecting the same to the valve-disk $e$. The open end of the inclined portion of the valve-body is more deeply recessed and threaded and the removable sleeve $h$ thereby shortened in length.

We claim as our invention—

1. The combination with the valve-body in a line of piping having an inclined portion and flange, of a bonnet adapted to be connected to the flange of the inclined portion of the body, a threaded valve-stem, a packing-gland therefor connected to the bonnet, a removable valve and face connected to the said valve-stem, a removable valve-seat and a removable sleeve and nut for clamping the sleeve and seat in place in the body, substantially as set forth.

2. The combination with the valve-body in a line of piping having an inclined portion and flange, of a bonnet adapted to be connected to the flange of the inclined portion of the body, a threaded valve-stem, a packing-gland therefor connected to the bonnet and an interiorly-threaded portion of said bonnet through which the said valve-stem passes, a removable valve and face connected to the said valve-stem, a removable valve-seat, a removable sleeve and a nut for clamping the sleeve and seat in place in the body, substantially as set forth.

3. The combination in a valve with the body in the line of piping, and having an interiorly-threaded open end, of the valve-stem having an enlargement or head at its inner end, a valve-disk receiving the said head and a nut for securing the stem to the valve-disk, a removable valve-face, a removable valve-seat in the valve-body, a removable sleeve having an opening, means for preventing the said sleeve rotating in the body and a nut screwing into the interiorly-threaded open end of the body to hold the said sleeve and the removable valve-seat to place, substantially as set forth.

4. The combination in a valve with a body in the line of piping having an inclined portion and flange, of the valve-stem having an enlargement or head at its inner end, a valve-disk receiving the same and a nut upon the valve-stem for connecting the disk and stem, the outer face of the disk having transverse dovetailed recesses, a valve-face having transverse dovetailed ribs fitting the said recesses to connect the valve-face to the disk, a seat for the valve and devices for holding the valve-seat to place and permitting of the removal of the same, substantially as set forth.

5. The combination in a valve with a body in the line of piping having an inclined portion and flange, of the valve-stem having an enlargement or head at its inner end, a valve-disk receiving the same and a nut upon the valve-stem for connecting the disk and stem, the outer face of the disk having transverse dovetailed recesses, a valve-face having transverse dovetailed ribs fitting the said recesses to connect the valve-face to the disk, a removable valve-seat resting upon a shoulder in the body of the valve and between which and the valve-face there are inclined meeting faces, a removable sleeve in the body of the valve having an opening providing for the passage of material through the valve-body, a lug on the upper end of the said removable sleeve engaging a recess in the valve-body, a nut screwing into the open end of the valve-body down upon the removable sleeve for holding the sleeve and the valve-seat in place in the valve-body, substantially as set forth.

Signed by us this 5th day of February, 1900.

JAMES H. BAKER.
GEO. F. SHEVLIN.
FREDERICK H. BAKER.

Witnesses:
J. W. CRANE,
JOHN S. BARBORN.